United States Patent
Francavilla

(10) Patent No.: US 11,946,788 B2
(45) Date of Patent: Apr. 2, 2024

(54) AIRLESS METERED FLUID DISPENSER ASSEMBLY

(71) Applicant: Lucas Packaging Group, Inc., Sussex, NJ (US)

(72) Inventor: Frank Francavilla, Sussex, NJ (US)

(73) Assignee: Lucas Packaging Group, Inc., Sussex, NJ (US)

( * ) Notice: Subject to any disclaimer, the term of this patent is extended or adjusted under 35 U.S.C. 154(b) by 22 days.

(21) Appl. No.: 17/565,940

(22) Filed: Dec. 30, 2021

(65) Prior Publication Data

US 2022/0205825 A1 Jun. 30, 2022

Related U.S. Application Data

(60) Provisional application No. 63/132,052, filed on Dec. 30, 2020.

(51) Int. Cl.
*G01F 11/02* (2006.01)
*B05B 11/10* (2023.01)

(52) U.S. Cl.
CPC ......... *G01F 11/025* (2013.01); *B05B 11/1008* (2023.01); *G01F 11/028* (2013.01)

(58) Field of Classification Search
CPC ............... G01F 11/025; G01F 11/0028; B05B 11/1008; B05B 11/028; B05B 11/1023; B05B 11/106; B05B 11/1074; B05B 11/0032
See application file for complete search history.

(56) References Cited

U.S. PATENT DOCUMENTS

| | | | | |
|---|---|---|---|---|
| 589,965 A * | 9/1897 | Gonorovsky | ......... | G01F 11/025 222/320 |
| 1,913,062 A * | 6/1933 | Wheeler | ............... | G01F 11/028 222/38 |
| 3,687,339 A * | 8/1972 | Dessureault | ......... | A47K 5/1211 222/326 |
| 4,524,888 A * | 6/1985 | Tada | .................... | B05B 11/0064 222/153.07 |
| 4,589,573 A * | 5/1986 | Tada | .................... | B05B 11/1028 222/384 |
| 7,467,908 B2 | 12/2008 | Francavilla | | |
| 7,824,124 B2 | 11/2010 | Francavilla | | |
| 8,226,319 B2 | 7/2012 | Francavilla | | |
| 8,540,124 B2 | 9/2013 | Francavilla | | |
| 8,668,401 B2 | 3/2014 | Francavilla | | |
| 8,939,959 B2 * | 1/2015 | Baney | ............... | A61M 5/31595 604/218 |

(Continued)

FOREIGN PATENT DOCUMENTS

CA 2471638 6/2005
EP 1547694 6/2005

*Primary Examiner* — Paul R Durand
*Assistant Examiner* — Randall A Gruby
(74) *Attorney, Agent, or Firm* — Anooj Patel; Heber Martin Carbajal; Hankin Patent Law, APC

(57) ABSTRACT

A liquid dispensing apparatus including a dispensing nozzle, end cap housing, lock-out mechanism, and dosage collar, wherein the lock-out mechanism is configured to prevent additional actuation of the dispensing nozzle and the dosage collar is configured to determine how far the dispensing nozzle may travel without resetting, which may allow the user to dispense a specific dosage of material to be dispensed via the dispensing nozzle.

7 Claims, 11 Drawing Sheets

(56) References Cited

U.S. PATENT DOCUMENTS

| | | | | |
|---|---|---|---|---|
| 9,211,559 B2* | 12/2015 | Law | ................... | B05B 11/1067 |
| 10,821,458 B2* | 11/2020 | Hopkin | ............... | B05B 11/1059 |
| 2019/0001358 A1* | 1/2019 | Lee | ................... | B05B 11/1087 |
| 2022/0379047 A1* | 12/2022 | Van Barneveld | ..... | B05B 11/025 |

* cited by examiner

AIRLESS METERED FLUID DISPENSER ASSEMBLY

CROSS-REFERENCE TO RELATED APPLICATIONS

This Non-Provisional Application claims the benefit of and priority to U.S. Provisional Patent Application No. 63/132,052, filed on Dec. 30, 2020, by inventor Frank Francavilla, the contents of which are expressly incorporated herein by this reference.

FIELD OF INVENTION

The present disclosure is generally directed to dispensing assemblies, and more specifically to fluid dispensers configured to dispense a specific volume of liquid, solution, or suspension comprising additional features.

BACKGROUND

Various types of dispensers for fluids are well known in the art. Dispensers typically comprise a cartridge for holding the fluid material, as well as a spray, pump, or plunger to dispense the fluid material out of the cartridge. Some dispensers have a spray pump attached to a pump line that runs through a cartridge containing fluid material, such as perfume. When the user depresses the spray pump, fluid material flows through the line to the spray, and then onto the desired medium. Other dispensers, such as those used for caulking, have a cartridge filled with caulk, and a trigger mechanism which causes a plunger in the cartridge to push the caulk out of the cartridge.

Dispensers may also be used to provide various medicines and drugs, where tight controls may be beneficial. Additionally, a sprayed version of a drug may be introduced to the body and have an effect much more quickly than traditionally metabolized drugs, which may also mean that the specific volumes administered must be precise to prevent over or under dosing.

While many dispensers include some sort of covering to prevent unintended actuation, traditional methods such as placing a simple cap over an actuator may provide some opportunity for unintentional dispensing.

Additionally, when administering a medication, a user may be unsure as to the exact amount of material dispensed and may accidentally over or under dispense. In the case of medication, this may be a significant problem.

Furthermore, a user may desire to administer a dosage that must be precise, but also variable depending on the circumstances of administration.

Some existing liquid dispensing devices include U.S. Pat. Nos. 7,467,908, 7,824,124, 8,226,319, 8,668,401, and 8,540,124, but while these liquid dispensers disclose devices capable of airless metered liquid dispensing, they do not include specific safety features to ensure accurate and precise liquid dispensation.

Thus, what is needed is a metered fluid dispenser that may be used to dispense medicine and drugs in controlled amounts while having have structures in place to prevent unintentional activation, but also allow for variable dosages.

SUMMARY OF EMBODIMENTS

Various embodiments of the present disclosure may be directed to a metered dispensing assembly. The metered dispensing assembly may comprise a dispensing nozzle, an end cap housing, and a lock-out mechanism. In some embodiments, the metered dispensing assembly may further comprise a dosage collar to allow the user to customize the amount of material dispensed on an as needed basis.

One embodiment may be a metered dispensing assembly comprising: a dispensing nozzle; an end cap housing; and a lock-out mechanism; wherein the end cap housing may be configured to engage a reservoir; wherein the lock-out mechanism may be configured to prevent more than a predetermined amount of a material housed within the reservoir to dispense through the dispensing nozzle. The lock-out mechanism may comprise a locking sleeve and biasing element; and the locking sleeve may comprise a locking structure configured to prevent movement of the dispensing nozzle after the dispensing nozzle undergoes an actuation. The locking structure may be a plurality of notches. A distal end of the locking sleeve may engage the dispensing nozzle. The end cap housing may comprise one or more locking teeth configured to engage the locking structure such that when the dispensing nozzle may be actuated and the locking sleeve actuates with the dispensing nozzle, the one or more locking teeth engage the locking structure to substantially prevent the dispensing nozzle from returning to a pre-actuated position based on a distal force applied by the biasing element. The locking sleeve may comprise a reset channel, such that when the locking sleeve may be rotated relative to the end cap housing, the one or more locking teeth slide into the reset channel such that the one or more locking teeth disengage with the locking structure and the distal force applied by the biasing element causes the dispensing nozzle to return to the pre-actuated position. The end cap housing may comprise an inner wall and outer wall; wherein the outer wall may comprise the one or more locking teeth. The one or more locking teeth comprise a downward sloping structure that may be configured to allow the end cap housing to flex outward to allow the locking structure to slide by the one or more locking teeth when the dispensing nozzle may be actuated and resists allowing the biasing element to cause the dispensing nozzle to return to the pre-actuated position. The one or more locking teeth may face inward on the end cap housing. The material may be a solution or colloidal suspension. The end cap housing may comprise a dispensing structure; wherein the dispensing structure may be configured to transfer the material from the reservoir to the dispensing nozzle when the dispensing nozzle may be actuated. The dispensing nozzle may comprise a threaded surface that may be configured to rotably engage a nozzle cover. The metered dispensing assembly may further comprise a dosage collar; wherein the dosage collar may be configured to at least partially restrict the actuation of the dispensing nozzle. The dosage collar may comprise one or more step levels, such that each of the one or more step levels defines a distance that the dispensing nozzle may be able to actuate. The dosage collar may comprise a locked configuration, a single dose configuration, and a double dose configuration.

Another embodiment may be a liquid dispensing apparatus comprising: a metered dispensing assembly; and a container; wherein the container may comprise a diaphragm; wherein the container may be configured to house a material; wherein the metered dispensing assembly may comprise a dispensing nozzle, an end cap housing, and a dispensing structure; wherein the dispensing nozzle may be configured to actuate downward into an actuated position; wherein when the dispensing nozzle may be actuated to the actuated position, the material may be configured to dispense from the dispensing nozzle; wherein when the dispensing nozzle may be returned to an original position, the material may be drawn from the container and into the dispensing structure; wherein the dispensing structure may comprise a dispensing inlet, a material loading chamber, and a piston; and wherein when the dispensing nozzle may be returned to the original position, the diaphragm may be pulled in an upward direction. The container may comprise a container o-ring configured to create an airtight seal between the diaphragm and the container. The metered dispensing assembly further may comprise a biasing element; wherein the biasing element may be configured to apply an upward force to cause the dispensing nozzle to return to an original configuration. The dispensing structure may comprise a dispensing o-ring, wherein the dispensing o-ring may be configured to create an airtight seal between a bottom portion of the piston and the material loading chamber. The dispensing inlet may be a check valve; wherein when the material may be drawn from the container into the dispensing structure, the material may be drawn through the dispensing inlet and enters the material loading chamber.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps, which are illustrated. When the same numeral appears in different drawings, it refers to the same or like components or steps.

DETAILED DESCRIPITION OF THE DRAWINGS

Figure 1A:
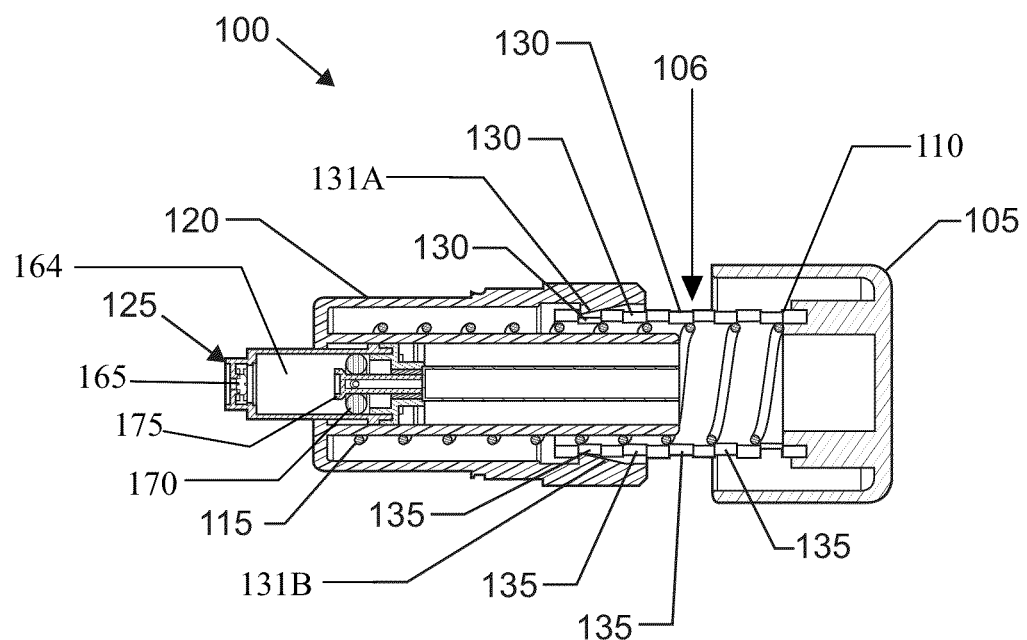
FIGS. 1A-B are illustrations of cross sections of a metered dispensing assembly.

To minimize the limitations in the cited references, and to minimize other limitations that will become apparent upon reading and understanding the present specification, the present specification discloses a garment that is designed to prevent premature aging and malposition of prosthesis-augmented breasts. The garment may have reinforced lateral support that is designed to prevent internal sliding of breast implants and supportive straps with vectors that are oriented upwards and inwards.

In the following detailed description of various embodiments, numerous specific details are set forth in order to provide a thorough understanding of various aspects of the embodiments. However, these embodiments may be practiced without some or all of these specific details. In other instances, well-known methods, procedures, and/or components have not been described in detail so as not to unnecessarily obscure aspects of the embodiments.

While multiple embodiments are disclosed, still others will become apparent to those skilled in the art from the following detailed description. As will be realized, these embodiments are capable of modifications in various obvious aspects, all without departing from the spirit and scope of protection. Accordingly, the graphs, figures, and the detailed descriptions thereof, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about," may refer to a deviance of between 0.0001-10% from the indicated number or range of numbers.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are signified both in relation to the other endpoint, and independently of the other endpoint.

"Optional" or "optionally" means that the subsequently described event or circumstance may or may not occur, and that the description includes instances where the event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments. It is to be understood that the methods and systems are not limited to specific methods, specific components, or to particular implementations. It is also to be understood that the terminology used herein is for the purpose of describing particular embodiments only and is not intended to be limiting.

In one embodiment, the dispenser of the present disclosure may liquid dispenser having a push actuator to dispense liquid contained inside the dispenser, wherein the actuator comprises threads configured to receive corresponding threads of a cap.

Figure 1B:
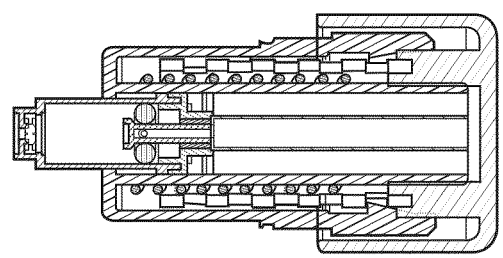

FIGS. 1A-B are illustrations of cross sections of a metered dispensing assembly. FIG. 1A shows the metered dispensing assembly in a first position, which is not actuated, while FIG. 1B shows the metered dispensing assembly in a second position, which is actuated. As shown in FIG. 1, the metered dispensing assembly 100 may comprise a dispensing nozzle 105, an end cap housing 120, and a lock-out mechanism 106.

The dispensing nozzle 105 may also comprise a nozzle fitment configured to cover the dispensing nozzle 105. The end cap housing 120 may be configured to engage a reservoir or container adapted to store materials, such as solutions, solvents, colloidal suspensions, or medicinal products. In a preferred embodiment, materials stored within the reservoir or container may be configured to be dispensed by the dispensing nozzle 105 when the dispensing nozzle 105 is actuated from a first position as shown in FIG. 1A to a second position as shown in FIG. 1B. The end cap housing 120 may comprise a dispensing structure 125 configured to draw material from the reservoir or container to dispense through the dispensing nozzle 105. The dispensing nozzle 105 may be actuated downward, which may cause material contained within the piston 175 and material loading chamber 164 to be expelled from the dispensing nozzle 105. The biasing element 115 may apply an upward force to the dispensing nozzle 105 after actuation, thereby causing the dispensing nozzle 105 to return to its original position.

When the dispensing nozzle 105 is moved from an actuated position to its original position, the piston 175 may apply an upward suction to material contained within a container or reservoir, not shown, to draw this material from a container or reservoir into the material loading chamber 164. The dispensing O-ring 170 may ensure that when the piston 175 travels up and down, as the dispensing nozzle 105 is actuated, that material stays within the material loading chamber 164 or piston 175. A piston 175 may be hollow, or otherwise engage a tube, in order to allow for material to be drawn from the material loading chamber 164 to the dispensing nozzle 105. In a preferred embodiment, the dispensing structure 125, material loading chamber 164, dispensing inlet 165, dispensing o-ring 170, piston 175, in combination with the reservoir or container may be configured to dispense a predetermined amount of material, such as a single dose of a medication configured to be administered orally or through a spray. In a preferred embodiment, the dispensing structure 125, material loading chamber 164, dispensing inlet 165, dispensing o-ring 170, piston 175 in combination with the reservoir or container may comprise a metered airless dispensing mechanism, wherein the reservoir or container may comprise no air, which may be beneficial because it may prevent unexpected or unintended dosages of material to be dispensed. For example, if the reservoir or container is configured to comprise air or a substance that is not the material to be dispensed, it is possible that non-material is dispensed along with material, which may make ensuring precise and repeatable dosages difficult to administer. The metered dispensing assembly 100 may be configured to engage existing reservoirs and containers.

The lock-out mechanism 106 may comprise the locking sleeve 110 and biasing element. The locking sleeve 110 may be substantially cylindrical and comprise one or more notches, which may also be referred to herein as locking structures. In a preferred embodiment, the locking sleeve 110 may comprise a plurality of linearly positioned notches 130,135 that are located along the length of the locking sleeve. In a preferred embodiment, there are multiple sets of linearly positioned notches, such as two or three sets of notches. In one embodiment, the biasing element 115 may be a spring. The locking sleeve 110 may also comprise one or more reset channels 140, shown in FIG. 2. The reset channels 140 may be substantially linear and parallel to the notches 130, 135. In a preferred embodiment, the reset channels 140 may be smooth.

The end cap housing 120 may be configured to engage the lock-out mechanism 106 on one end of the lock-out mechanism 106, while the dispensing nozzle 105 may be configured to engage the lock-out mechanism 106 on a second, or distal, end of the lock-out mechanism. In one embodiment, the dispensing structure 125 of the end cap housing 120 may be configured to engage the dispensing nozzle 105 directly.

The end cap housing 120 may comprise a hollow portion formed by an inner wall and outer wall, wherein the lock-out mechanism 106 may be configured to rest or actuate with the hollow portion.

The end cap housing 120 may comprise a first locking tooth 131A and second locking tooth 131B. In a preferred embodiment, a first locking tooth 131A and second locking tooth 131B may be located on a distal portion of the outer wall and extend inward. A first locking tooth 131A and second locking tooth 131B may comprise one or more protrusions having a distal slope having a shallow angle relative to the outer wall and a proximal slope having a steep angle relative to the outer wall. In this configuration, a first locking tooth 131A and a second locking tooth 131B may allow notches 130, 135 to move toward a proximal end of the end cap housing 120 and resist allowing the notches 130, 135 to move toward a distal end of the end cap housing 120.

A first locking tooth 131A and a second locking tooth 131B may extend along a portion of a circumference of the outer wall. In one embodiment, a first locking tooth 131A and a second locking tooth 131B may be of a size suitable to engage the notches 130, 135 and the reset channel 140, but not both the notches 130, 135 and reset channel 140 at the same time. In one embodiment, a first locking tooth 131A and a second locking tooth 131B may be configured to engage the notches 130, 135 or the reset channel 140, depending on the relative rotational positions of the end cap housing 120 and the locking sleeve 110.

When the dispensing nozzle 105 is actuated from the first to second position, material contained within the reservoir or container may be dispensed through the dispensing nozzle 105. Concurrently with that action, a first locking tooth 131A and a second locking tooth 131B may engage the notches 130, 135, such that as the dispensing nozzle 105 is actuated, a first locking tooth 131A and a second locking tooth 131B may prevent the dispensing nozzle 105 from traveling in a distal direction. In this way, when the dispensing nozzle 105 is in its second, or actuated, position, the dispensing nozzle 105 is effectively held in place by the combination of a first locking tooth 131A and a second locking tooth 131B and notches 130, 135 to prevent distal movement of the dispensing nozzle 105, thereby preventing unintentional dispensing. In order to allow the dispensing nozzle 105 to return to its first, or unactuated, position, the user may rotate the dispensing nozzle 105 such that a first locking tooth 131A and or a second locking tooth 131B may disengage the notches, and preferably engage the reset channel 140. Once a first locking tooth 131A and a second locking tooth 131B engage the reset channel 140, a distal force applied by the biasing element 115 may cause the dispensing nozzle 105 to return to its first, or unactuated position.

In one embodiment, the biasing element 115 may be a spring. The biasing element 115 may be substantially any structure configured to apply a distal force to the dispensing nozzle 105 to allow the dispensing nozzle 105 to return to its first position when a first locking tooth 131A or a second locking tooth 131B do not engage the notches 130, 135.

In a preferred embodiment, there may be a plurality of linearly placed notches 130, 135, such that if the dispensing nozzle 105 is partially actuated, the dispensing nozzle 105 is prevented from returning to its first position unless the user rotates the dispensing nozzle 105 relative to the end cap housing 120 to cause a first locking tooth 131A and a second locking tooth 131B to engage the reset channel 140 instead of the notches, at which point, the biasing element 115 may cause the dispensing nozzle 105 to return to its first position.

Figure 2A:
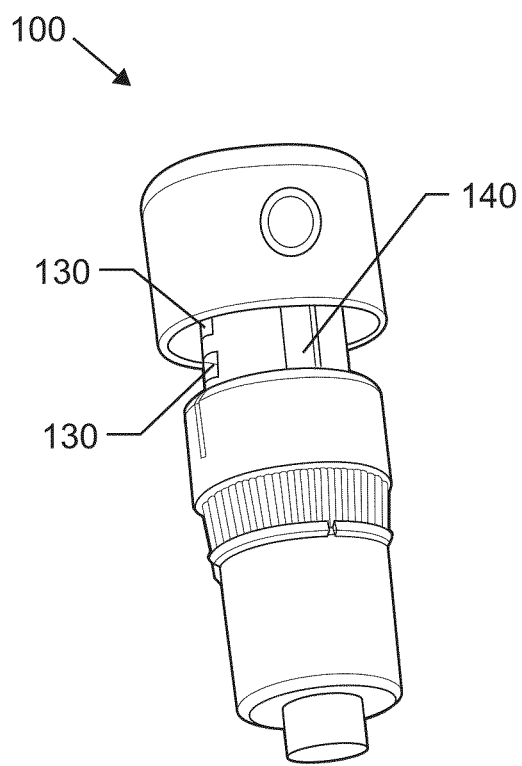
FIGS. 2A-B are illustrations of a metered dispensing assembly.
Figure 2B:
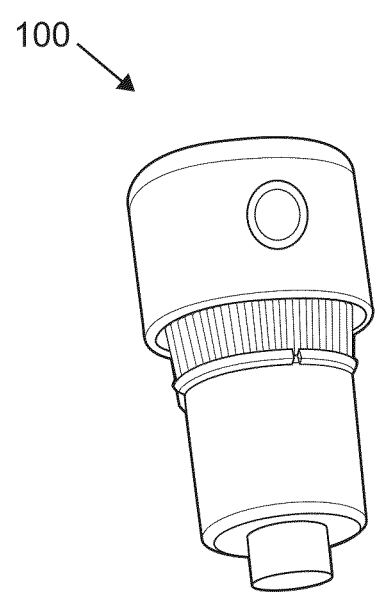

FIGS. 2A-B are illustrations of a metered dispensing assembly. FIG. 2A shows the metered dispensing assembly 100 in a first position, which is not actuated, while FIG. 2B shows the metered dispensing assembly 100 in a second position, which is actuated.

FIG. 2A more clearly shows the positional relationship between the notches 130, 135 and the reset channel 140. In one embodiment, the notches 130, 135 and reset channel 140 are located approximately 90 rotational degrees away from one another on a surface of the locking sleeve 110.

Figure 3:
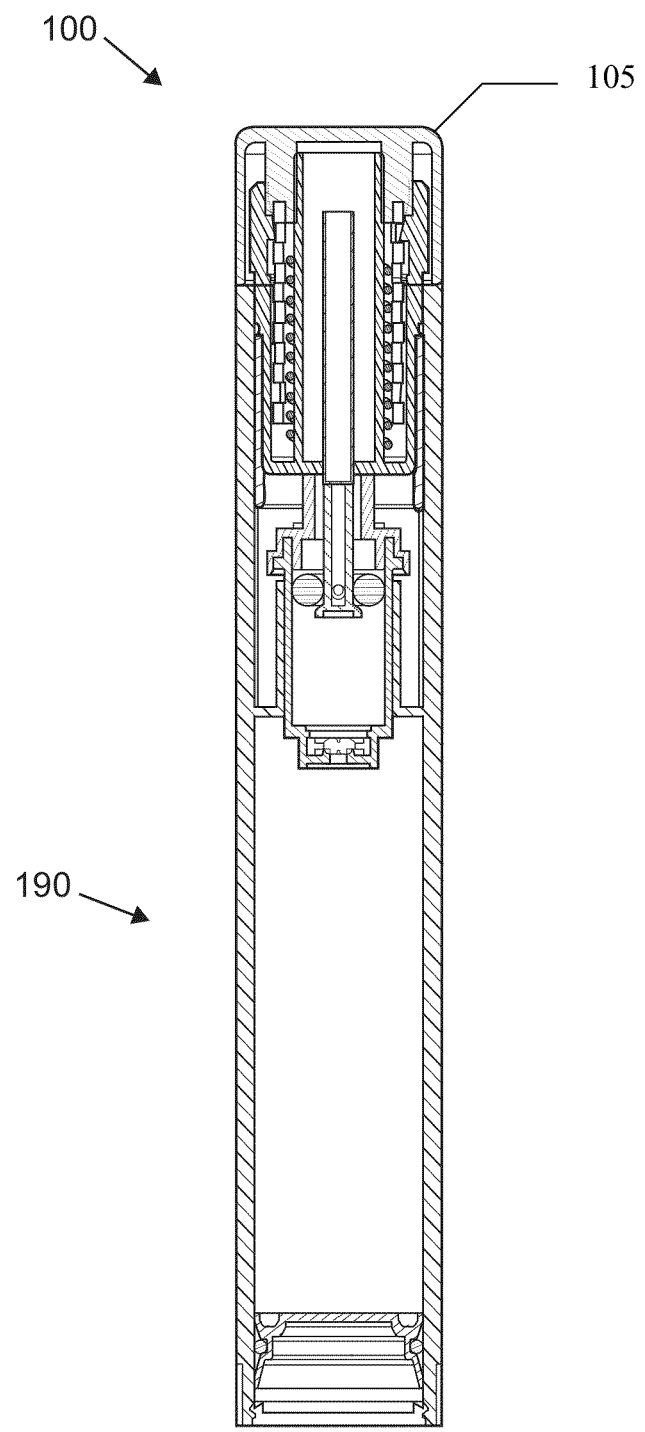
FIG. 3 is an illustration of a metered dispensing assembly engaging a reservoir or container.

FIG. 3 is an illustration of a metered dispensing assembly engaging a reservoir or container. As shown in FIG. 3, the end cap housing of the metered dispensing assembly may engage the reservoir or container, thereby forming a usable metered dispensing apparatus.

Figure 4:
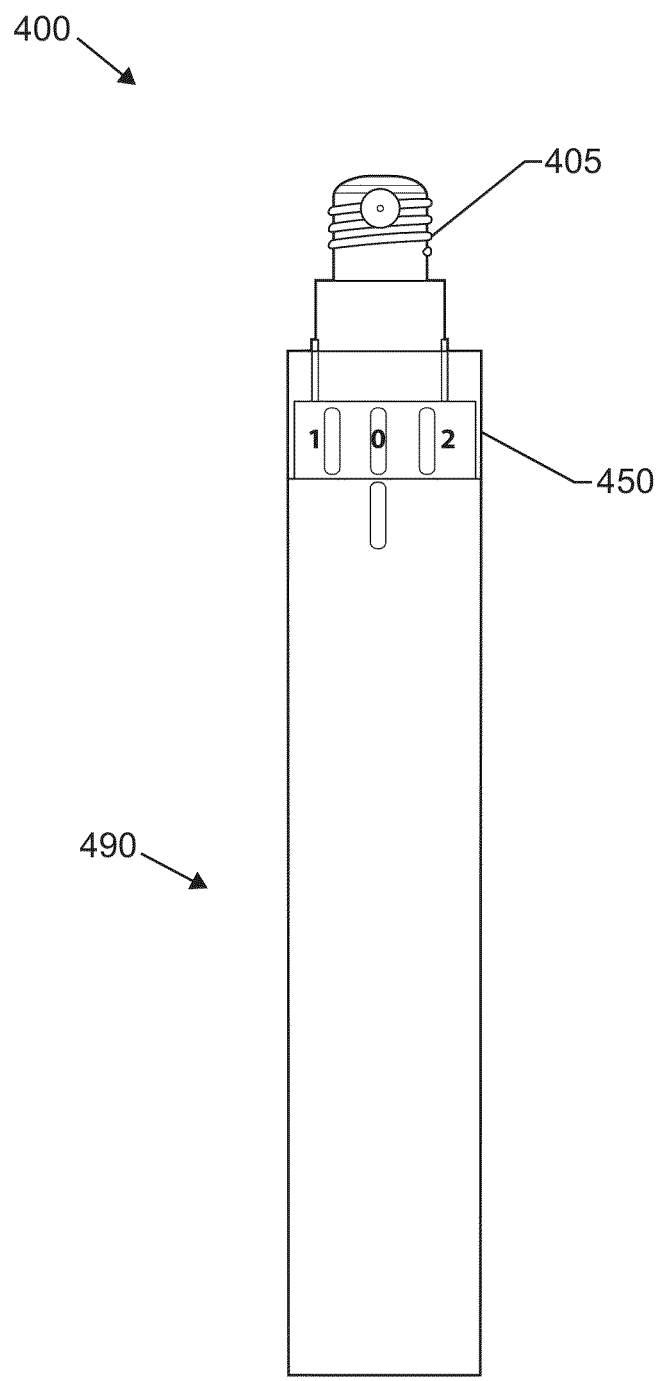
FIG. 4 is an illustration of a metered dispensing assembly with a dosage collar engaging a reservoir or container.

FIG. 4 is an illustration of a metered dispensing assembly with a dosage collar engaging a reservoir or container. The metered dispensing assembly 400 may be substantially similar to the metered dosing assembly 100 shown in FIG. 1, with the addition of a dosage collar 450. The dosage collar 450 may be configured to limited the actuating range of the dispensing nozzle 405 by physically interfering with a locking sleeve, or other actuating component of the metered dispensing assembly 400.

In one embodiment, the dosage collar 450 may be substantially cylindrical in shape and have an inner portion comprising one or more steps configured to engage a lower edge of the dispensing assembly or locking sleeve. Preferably, the one or more steps (shown in FIGS. 5A, 5C) translate to a distance of actuation allowed by the dispensing nozzle 405 equivalent to desired amounts of material to dispense. In one embodiment, the one or more steps may translate to no movement (no dosage), a first distance, and a second distance. Preferably, the first distance may translate to a single dosage of material, or medication, while the second distances may translate to a double dosage of material, or medication. It is understood that substantially any distance may be allowed by the dosage collar 450 from no distance to the entire length of possible actuation of the dispensing assembly. In other embodiments, additional steps may be included, such as three, four, five, or more steps. The steps may translate to different amount of material to be dispensed from the dispensing nozzle.

Figure 5A:
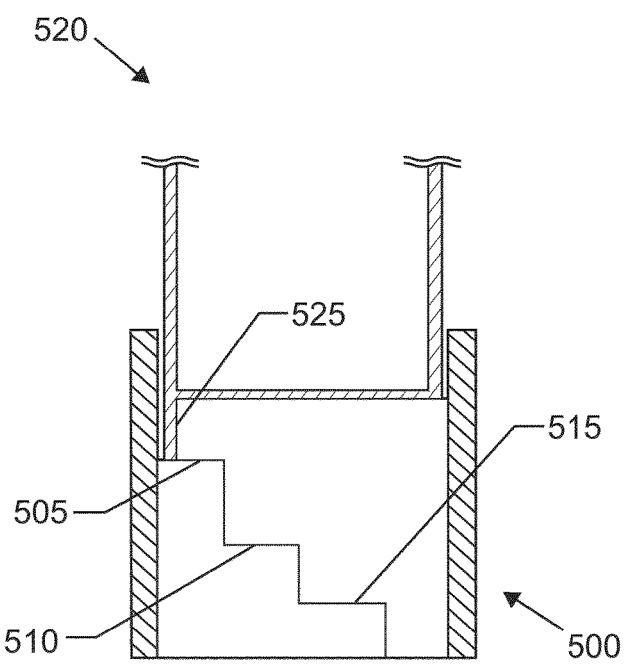
FIGS. 5A-C are illustrations showing how a dosage collar and dispensing nozzle may interact.
Figure 5C:
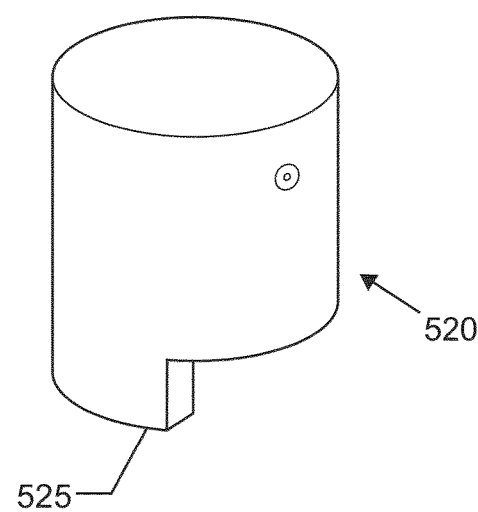
Figure 5B:
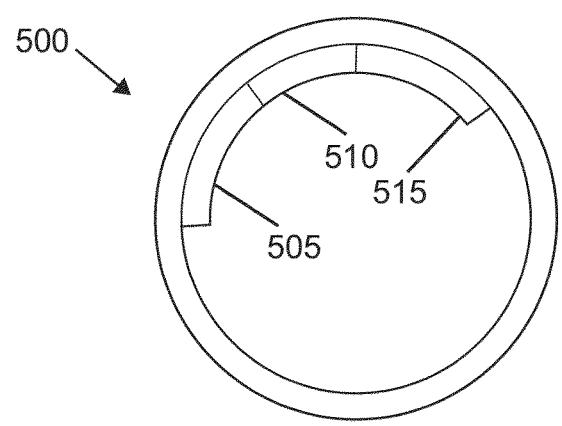

FIGS. 5A-C are illustrations showing how a dosage collar and dispensing nozzle may interact.

FIG. 5A is a cross section illustration of the dosage collar 500 engaging the dispensing nozzle 520.

FIG. 5B is a perspective view of the dispensing nozzle 520. As shown in FIG. 5B, the dispensing nozzle 520 may comprise a travel stem 525.

FIG. 5C is a top plan view of the dosage collar 500. As shown in FIG. 5C, the dosage collar may be substantially cylindrical, wherein the steps 505, 510, 515 may be located on an interior of the dosage collar 500 and adjacent to one another. In one embodiment, the steps 505, 510, 515 may be a partial arc on an interior of the dosage collar 500, wherein the arc preferably has less than a 90 degree angle. In alternate embodiments, the arc angle may be adjusted to fit the needs or use of the application.

The dosage collar 500 and dispensing nozzle 520 may be rotable relative to one another such that the travel stem 525 may be impeded from actuating by one of the steps 505, 510, 515. When the dosage collar 500 is rotated relative to the dispensing nozzle 520, the travel stem 525 may be impeded by different steps 505, 510, 515, thereby adjusting the amount of distance that the dispensing nozzle 520 may travel when actuated. In this way, different steps 505, 510, 515 may allow for different amounts of material dispensed from the dispensing nozzle 520.

In some embodiments, the metered dispensing assembly may comprise a dosage collar, dispensing nozzle, and lock-out mechanism. In alternate embodiments, the metered dispensing assembly may comprise a dosage collar and dispensing nozzle without the lock-out mechanism.

Figure 6:
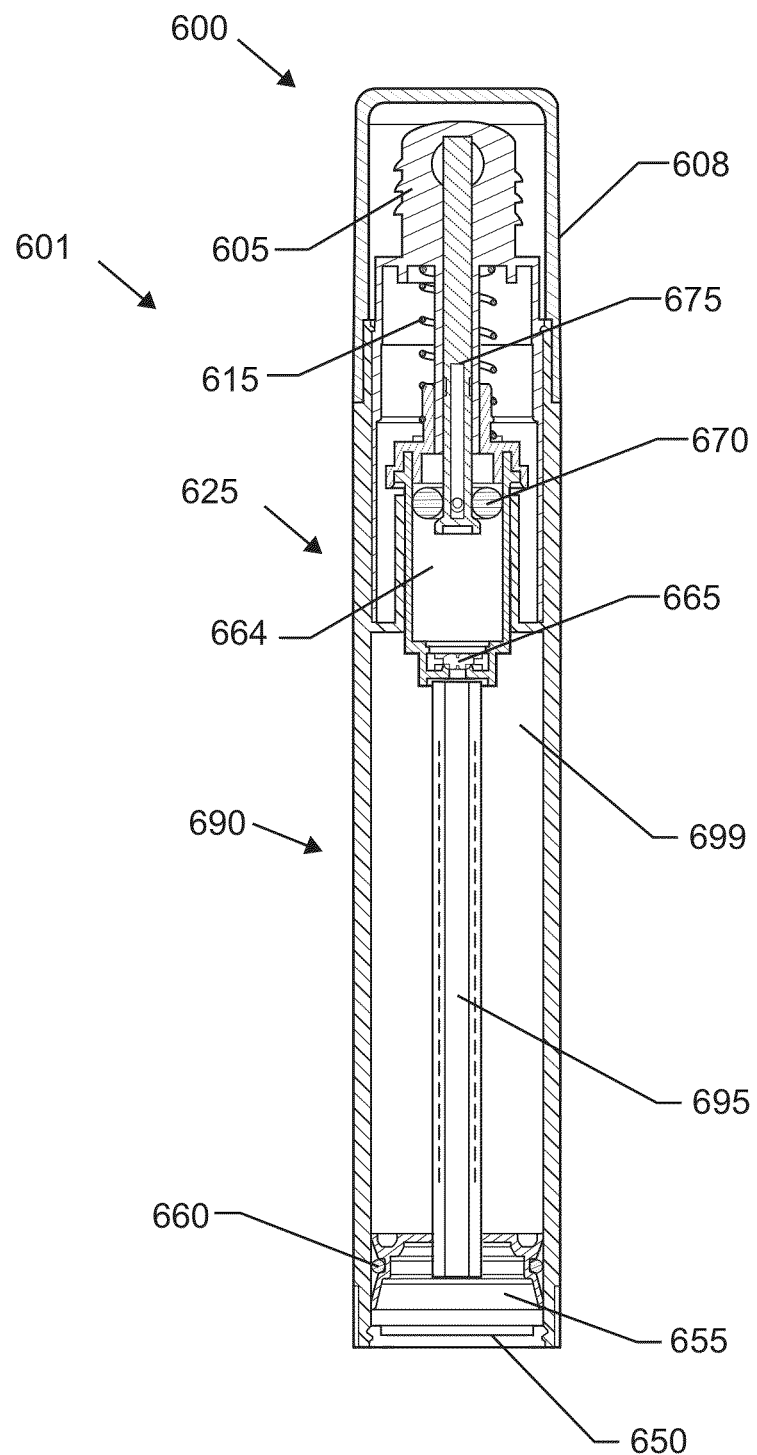
FIG. 6 is an illustration of an embodiment of a liquid dispensing apparatus.

FIG. 6 is an illustration of an embodiment of a liquid dispensing apparatus. As shown in FIG. 6, the liquid dispensing apparatus 600 may comprise a cap 608, metered dispensing assembly 601, and container 690.

The container 690 may comprise a base plug 650, diaphragm 655, and a base o-ring 660.

The container 690 may be configured to receive the metered dispensing assembly 601. The container 690 may be configured to store material in a container chamber 699.

The metered dispensing assembly 601 may comprise a dispensing nozzle 605 and dispensing structure 625.

The dispensing structure 625 may comprise a dispensing inlet 665, material loading chamber 664, piston 675, dispensing o-ring 670, and biasing element 615.

The dispensing inlet 665 may be a check valve configured to allow material stored in the container chamber 699 to enter the dispensing structure 625, but not the other way around.

The dispensing inlet 665 may be configured to receive a straw 695. The straw 695 may be configured to have a multitude of entry holes, such that when material is dispensed from the metered dispensing assembly 601, the material is taken from all locations within the container chamber 699, which may ensure homogonous distribution of material, especially when the material comprises a colloidal solution.

The dispensing nozzle 605 may be actuated downward, which may cause material contained within the piston 675 and material loading chamber 664 to be expelled from the dispensing nozzle 605. The biasing element 615 may apply an upward force to the dispensing nozzle 605 after actuation, thereby causing the dispensing nozzle 605 to return to its original position. When the dispensing nozzle 605 is moved from an actuated position to its original position, the piston 675 may apply an upward suction to material contained within the container chamber 699 in order to draw this material from the container chamber 699 into the material loading chamber 664. The dispensing o-ring may ensure that when the piston 675 travels up and down as the dispensing nozzle 605 is actuated, that material stays within the material loading chamber 664 or piston 675.

As material is drawn into the material loading chamber 664, the base plug 650, diaphragm 655, and base o-ring 660 may be drawn upward within the container chamber 699. In one embodiment, the base plug 650 and diaphragm 655 may be annular in shape in order to allow the straw 695 to remain in place as material is dispensed without creating a lasting vacuum.

In some embodiments, the diaphragm 655 may be annular in shape to allow the straw 695 to remain in place while material is drawn from the container chamber 699 without creating a lasting vacuum. In this embodiment, the base plug 650 may be a solid disc, or a perforated disc, as long as the space between the base plug 650 and diaphragm 655 is able to not maintain a lasting vacuum, such as by being open to atmospheric pressure.

The piston 675 may be hollow, or otherwise engage a tube, in order to allow for material to be drawn from the material loading chamber 664 to the dispensing nozzle 605

The straw 695 may allow material to be evenly distributed during the airless suction action provided during the actuation/dispensing action by pulling material from a multitude of micro holes within the container chamber 699 during the dispensing life cycle. The straw 695 may be affixed to the dispensing inlet 665 and may run the full length of the container chamber 699.

Figure 7:
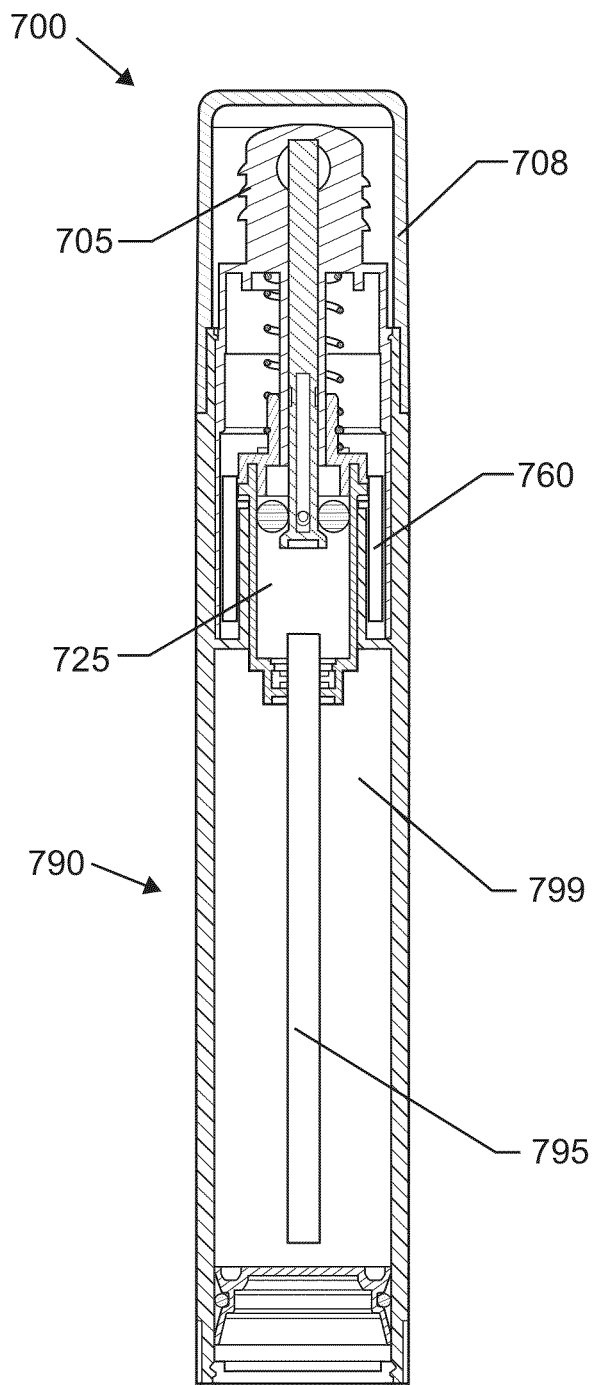
FIG. 7 is an illustration of an embodiment of a metered dispensing assembly engaging a non-airless liquid dispenser.

FIG. 7 is an illustration of an embodiment of a metered dispensing assembly engaging a non-airless liquid dispenser. As shown in FIG. 7, the metered dispensing assembly 701 may be substantially similar to the metered dispensing assembly 601, with the addition of a conversion collar 760 configured to allow the metered dispensing assembly 701 to engage a non-airless liquid dispenser 790, such as a non-airless reservoir or container.

Figure 8A:
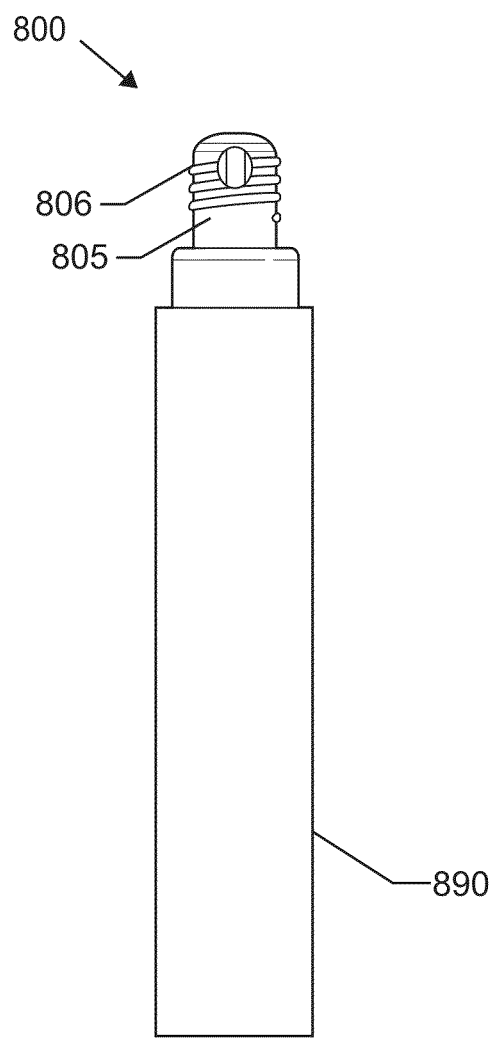
FIGS. 8A-B are illustrations of a fluid dispenser with a child resistant structure.
Figure 8B:
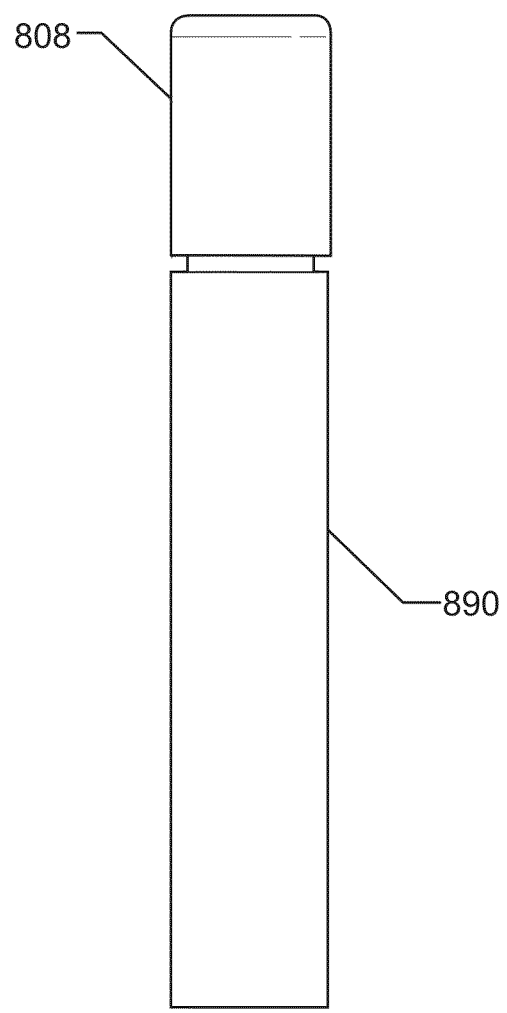
Figure 9:
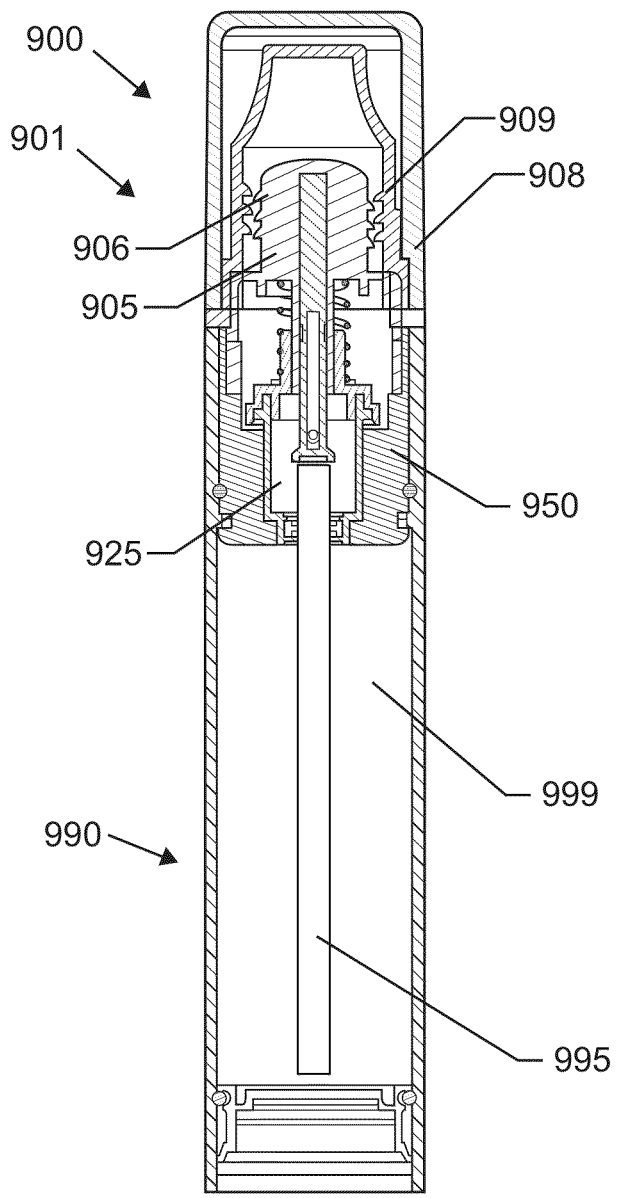
FIG. 9 is an illustration of a cross-section of a fluid dispenser with a child resistant structure.

FIGS. 8A-B are illustrations of a fluid dispenser with a child resistant structure. FIG. 8A is an illustration of the fluid dispenser 800. FIG. 8B is an illustration of the fluid dispenser 800 with a cap 808. As shown in FIG. 8B, the fluid dispenser 800 may comprise a dispensing nozzle 805, and the dispensing nozzle 805 may comprise a nozzle threaded surface 806. The nozzle threaded surface 806 may be configured to engage a complementary cap threaded surface, which may be located on an inside surface of the cap 808, as shown in FIG. 9. In one embodiment, the cap 808 may be a child resistant cap, and require a user to squeeze the cap 808 and fluid dispenser 800 together in order to allow the cap 808 to rotably disengage the nozzle threaded surface 806.

FIG. 9 is an illustration of a cross-section of a fluid dispenser with a child resistant structure. As shown in FIG. 9, the fluid dispenser 900 may comprise a reservoir 990, metered dispensing assembly 901, and cap 908. The metered dispensing assembly 901 may be substantially similar to the metered dispensing assembly 100 shown in FIG. 1, including a dispensing nozzle 905. The dispensing nozzle 905 may comprise a nozzle threaded surface 906.

The cap 908 may comprise a cap threaded surface 909 on an interior surface of the cap 908 configured to rotably engage the nozzle threaded surface 906 of the dispensing nozzle 905.

In one embodiment, the cap 908 may comprise a child resistant structure, such that removing the cap 908 from the dispensing assembly 901 may require an action to open that a child may find difficult to perform, such as by squeezing both the cap 901 and reservoir 990 at the same time.

Figure 10A:
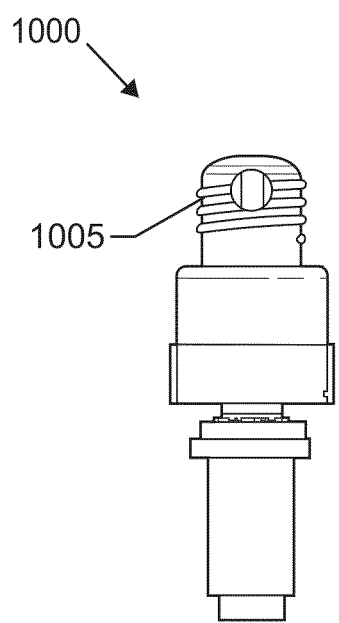
FIGS. 10A-B are illustrations of a metered dispensing assembly and cap.
Figure 10B:
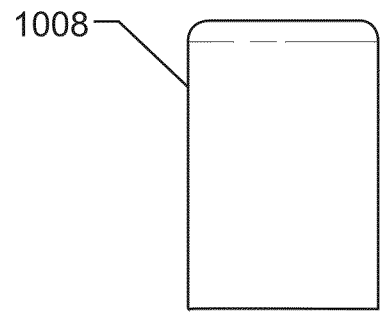

FIGS. 10A-B are illustrations of a metered dispensing assembly and cap. The metered dispensing assembly 1000 may be substantially similar to the metered dispensing assembly 100 shown in FIG. 1, and further comprise a nozzle threaded surface 1005. The cap 1008 may comprise a complementary cap threaded surface configured to rotably engage the nozzle threaded surface 1005.

Figure 11:
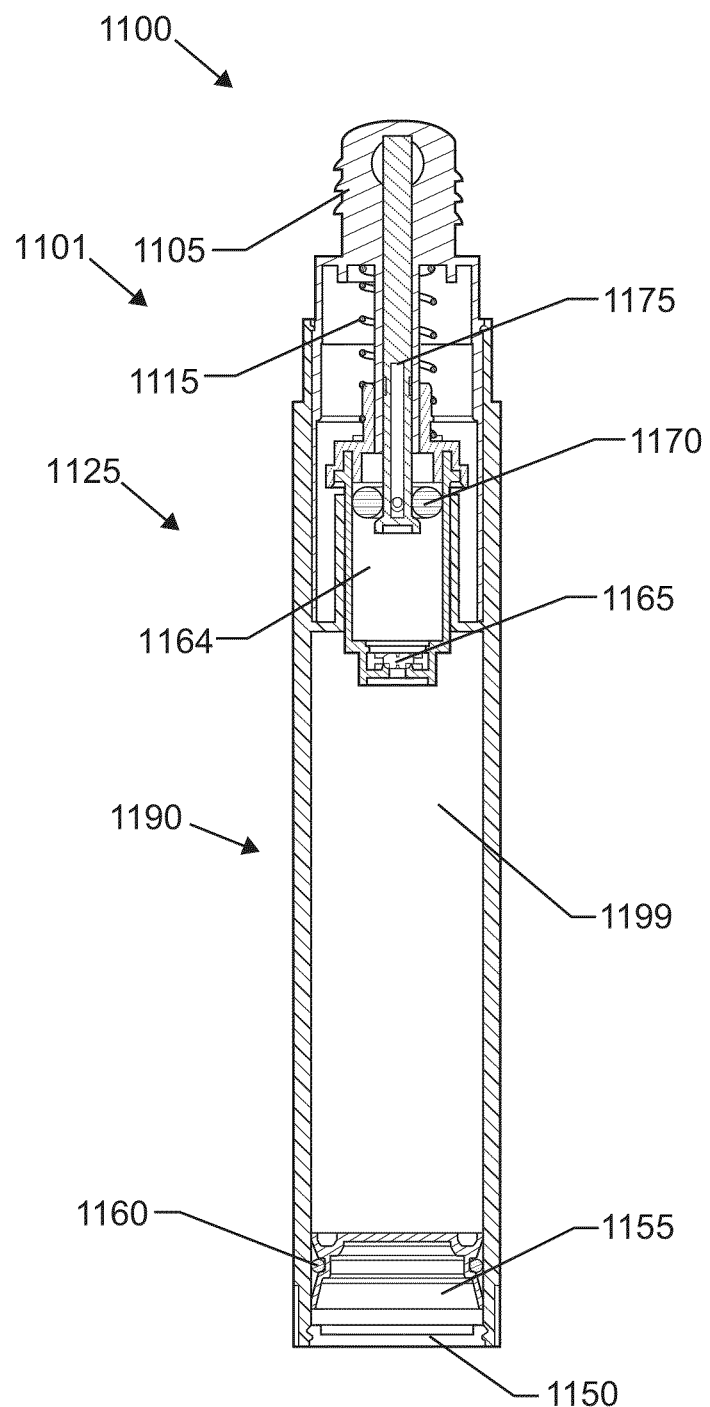
FIG. 11 is an illustration of an embodiment of a liquid dispensing apparatus.

FIG. 11 is an illustration of an embodiment of a liquid dispensing apparatus. The liquid dispensing apparatus 1100 is substantially similar to the liquid dispensing apparatus 600 shown in FIG. 6, with the difference that liquid dispensing apparatus 1100 does not have a straw 695 or cap 608.

As shown in FIG. 6, the liquid dispensing apparatus 1100 may comprise a cap 1108, metered dispensing assembly 1101, and container 1190.

The container 1190 may comprise a base plug 1150, diaphragm 1155, and a base o-ring 1160.

The container 1190 may be configured to receive the metered dispensing assembly 1101. The container 1190 may be configured to store material in a container chamber 1199.

The metered dispensing assembly 1101 may comprise a dispensing nozzle 1105 and dispensing structure 1125.

The dispensing structure 1125 may comprise a dispensing inlet 1165, material loading chamber 1164, piston 1175, dispensing o-ring 1170, and biasing element 1115.

The dispensing inlet 1165 may be a check valve configured to allow material stored in the container chamber 1199 to enter the dispensing structure 1125, but not the other way around.

The dispensing nozzle 1105 may be actuated downward, which may cause material contained within the piston 1175 and material loading chamber 1164 to be expelled from the dispensing nozzle 1105. The biasing element 1115 may apply an upward force to the dispensing nozzle 1105 after actuation, thereby causing the dispensing nozzle 1105 to return to its original position. In an alternate embodiment, a user may apply an upward force to the dispensing nozzle 1105, thereby not requiring the biasing element 1115. When the dispensing nozzle 1105 is moved from an actuated position to its original position, the piston 1175 may apply an upward suction to material contained within the container chamber 1199 in order to draw this material from the container chamber 1199 into the material loading chamber 1164. The dispensing o-ring may ensure that when the piston 1175 travels up and down as the dispensing nozzle 1105 is actuated, that material stays within the material loading chamber 1164 or piston 1175.

As material is drawn into the material loading chamber 1164, the base plug 1150, diaphragm 1155, and base o-ring 1160 may be drawn upward within the container chamber 1199. In one embodiment, the base plug 1150 and diaphragm 1155 may have a disc shape In this embodiment, the base plug 1150 may be a solid disc, or a perforated disc, as long as the space between the base plug 1150 and diaphragm 1155 is able to not maintain a lasting vacuum, such as by being open to atmospheric pressure.

The piston 1175 may be hollow, or otherwise engage a tube, in order to allow for material to be drawn from the material loading chamber 1164 to the dispensing nozzle 1105.

Unless otherwise stated, all measurements, values, ratings, positions, magnitudes, sizes, locations, and other specifications, which set forth in this specification, including in the claims that follow, are approximate, not exact. They are intended to have a reasonable range, which is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description, which shows and describes the illustrative embodiments. As will be realized, these embodiments are capable of modifications in various obvious aspects, all without departing from the spirit and scope of the present disclosure. Accordingly, the detailed description is to be regarded as illustrative in nature and not restrictive. Also, although not explicitly recited, one or more additional embodiments may be practiced in combination or conjunction with one another. Furthermore, the reference or non-reference to a particular embodiment shall not be interpreted to limit the scope of protection. It is intended that the scope of protection is not limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A metered dispensing assembly comprising:
    a dispensing nozzle;
    an end cap housing; and
    a lock-out mechanism;
    wherein said end cap housing is configured to engage a reservoir;
    wherein said lock-out mechanism prevents more than a single dose of a predetermined amount of a material housed within said reservoir to dispense through said dispensing nozzle without first being manually returned to a pre-actuated position by a user;
    wherein said lock-out mechanism comprises a locking sleeve and biasing element; and wherein said locking sleeve comprises a locking structure configured to prevent movement of said dispensing nozzle after said dispensing nozzle undergoes an actuation;
    wherein said locking structure comprises a plurality of notches; and,
    wherein said end cap housing comprises one or more locking teeth located radially outward from the locking sleeve and configured to engage said locking structure such that when said dispensing nozzle undergoes said actuation said locking sleeve actuates with said dispensing nozzle, said one or more locking teeth engage said locking structure to substantially prevent said dispensing nozzle from returning to said pre-actuated position, when said dispensing nozzle is rotated to align said locking teeth and a plurality of notches, based on a distal force applied by said biasing element.

2. The metered dispensing assembly of claim 1, wherein a distal end of said locking sleeve engages said dispensing nozzle.

3. The metered dispensing assembly of claim 1, wherein said locking sleeve comprises a reset channel, such that when said locking sleeve is rotated relative to said end cap housing, said one or more locking teeth slide into said reset channel such that said one or more locking teeth disengage with said locking structure and said distal force applied by said biasing element causes said dispensing nozzle to return to said pre-actuated position.

4. The metered dispensing assembly of claim 3, wherein said end cap housing comprises an inner wall and outer wall; and
    wherein said outer wall comprises said one or more locking teeth.

5. The metered dispensing assembly of claim 4, wherein said one or more locking teeth comprise a downward sloping structure that is configured to allow said end cap housing to flex distally to allow said locking structure to slide by said one or more locking teeth when said dispensing nozzle undergoes said actuation and resists allowing said biasing element to cause said dispensing nozzle to return to said pre-actuated position.

6. The metered dispensing assembly of claim 5, wherein said one or more locking teeth are on an interior surface of said end cap housing.

7. The metered dispensing assembly of claim 6, wherein said end cap housing comprises a dispensing structure; and
    wherein said dispensing structure is configured to transfer said material from said reservoir to said dispensing nozzle when said dispensing nozzle undergoes said actuation.

* * * * *